United States Patent [19]

Reed et al.

[11] 4,060,480
[45] Nov. 29, 1977

[54] HYDROCARBON HYDROCONVERSION PROCESS EMPLOYING HYDROXY-ALUMINUM STABILIZED CATALYSTS SUPPORTS

[75] Inventors: Marion G. Reed, Hacienda Heights; Joseph Jaffe, Berkeley, both of Calif.

[73] Assignee: Chevron Research Company, San Francisco, Calif.

[21] Appl. No.: 419,178

[22] Filed: Nov. 26, 1973

Related U.S. Application Data

[62] Division of Ser. No. 177,819, Sept. 3, 1971, Pat. No. 3,798,177.

[51] Int. Cl.$^2$ ............... C10G 13/04; C10G 23/02; C01B 29/28; C10G 27/08
[52] U.S. Cl. .................... 208/111; 208/108; 208/112; 208/120; 208/139; 208/215; 208/216; 208/251 H; 208/415; 252/412; 252/455 Z; 252/465

[58] Field of Search ............. 208/108, 111, 112, 120, 208/134; 252/415, 442

[56] References Cited

U.S. PATENT DOCUMENTS

| 2,285,314 | 6/1942 | Thomas et al. | 252/451 |
| 2,410,436 | 11/1946 | Ewing | 208/121 |
| 3,224,961 | 12/1965 | Erickson et al. | 208/120 |
| 3,562,148 | 2/1971 | Mitsche | 252/455 |
| 3,607,043 | 9/1971 | McDaniel et al. | 423/328 |

Primary Examiner—Delbert E. Gantz
Assistant Examiner—G. E. Schmitkons
Attorney, Agent, or Firm—D. A. Newell; R. H. Davies; D. L. Hagmann

[57] ABSTRACT

The disclosure provides a novel catalyst support, a method of making said support by treatment of prior art crystalline catalyst supports with hydroxy-aluminum solution and hydrocarbon conversion processes wherein the catalyst used therein includes said support.

12 Claims, No Drawings

HYDROCARBON HYDROCONVERSION PROCESS EMPLOYING HYDROXY-ALUMINUM STABILIZED CATALYSTS SUPPORTS

This application is a division of U.S. Ser. No. 177,819, filed Sept. 3, 1971, now U.S. Pat. No. 3,798,177.

BACKGROUND OF THE INVENTION

The invention relates to a method of treating a crystalline catalyst support whereby its structural and catalytic properties are improved. The method comprises contacting the catalyst support with a hydroxy-aluminum solution having a ratio of hydroxyl groups to aluminum atoms in the range from about 1.5 to about 2.7.

Catalyst support materials are useful for a number of processes, particularly such supports are useful for hydrocarbon conversion processes. Typical processes are hydrocracking, catalytic cracking, reforming, hydrofining, isomerization, dewaxing and the like. The catalyst art always needs new and useful catalyst supports or carriers.

BRIEF DESCRIPTION OF THE INVENTION

The present invention provides a novel catalyst support, hydrocarbon conversion processes using said novel catalyst support, nd a method for preparing this novel catalyst support. The novel catalyst support comprises a crystalline catalyst support of the prior art which has been treated with a hydroxy-aluminum solution having a ratio of the hydroxyl groups to aluminum groups within the range from about 1.5 to about 2.7, and preferably 2.0 to 2.4. The process for preparing a novel catalyst support comprises treating a crystalline catalytic support of the prior art with a hydroxy-aluminum solution having a ratio of hydroxyl groups to aluminum atoms within the range from about 1.5 to about 2.7.

GENERAL DESCRIPTION OF THE INVENTION

The crystalline catalyst supports of the prior art may be benefited by treatment with a hydroxy-aluminum solution as set out herein. In particular, natural and synthetic layered clay-type mineral catalyst supports and natural and synthetic crystalline zeolitic molecular sieve-type catalyst supports can be benefited through reaction with the hydroxy-aluminum solution. Non-crystalline supports, such as amorphous silica-alumina, may also be benefited through being contacted with a hydroxy-aluminum solution to form a novel catalyst composition of matter. However, it is generally preferred that the catalytic carrier which is improved by treatment with a hydroxy-aluminum solution be a crystalline catalytic material.

The hydroxy-aluminum treatment of catalyst supports of the prior art stabilizes the crystalline structures of the catalyst support material; for example, when natural or synthetic clay materials are treated with the hydroxy-aluminum solution as disclosed by the present invention, the clay layers become held at substantially a contant separation from one another and the clay minerals do not expand upon exposure to water. Thus, for example, successive smectite, and in particular montmorillonite layers which have been treated with the hydroxy-aluminum solution exhibit a basal separation of about 15 Angstroms as determined by x-ray diffraction and this 15 Angstrom separation is retained even when the montmorillonite clay mineral is exposed to water. The basal separation is the distance between successive repeating clay layers as shown by x-ray diffraction. This is in sharp contrast to montmorillonite which has not been treated with a hydroxy-aluminum solution wherein exposure to water will lead to a large change in the separation of the successive montmorillonite layers from one another. Although not meaning to be bound by theory, it is believed that the hydroxy-aluminum solution treatment of crystalline materials leads to the formation of gibbsite-like layers between the crystalline layers of the catalyst support material.

In some cases, it is desirable to treat a catalyst support material with the hydroxy-aluminum solution by the method of the present invention so as to expand the support so that it will have desirable surface area and pore diameter properties for any particularly desired catalytic application.

The hydroxy-aluminum treated crystalline catalyst support is aged in water, preferably pure water, for at least 3 hours and preferably for about 24 hours. Aging is beneficial because it allows the adsorbed hydroxy-aluminum to polymerize. The larger polymerized species are more resistant to exchange reactions and provide more strength to the support.

In a typical application, a crystalline catalytic support is treated with a solution formed by mixing water first with a quantity of aluminum salts selected from the group consisting of aluminum chloride, aluminum bromide, aluminum iodide, aluminum nitrate, aluminum sulfate and aluminum acetate. The selected salt is added in an amount of between 0.01 and 24.0 pounds of aluminum per 42 gallons of water (i.e., "oil barrel") to form an aluminum solution. To this aluminum solution is added an alkali, alkaline earth, ammonia or substituted ammonia base in an amount from 0.95 to 1.7 pounds of hydroxyl ion for each pound of aluminum to form a hydroxy-aluminum solution. The aforesaid hydroxy-aluminum solution is formed in the manner hereinafter described in a suitable mixing tank and is then contacted with a crystalline catalyst base. The resulting catalyst base may be improved over catalyst base which has not been treated with a hydroxy-aluminum solution, in particular the stability and strength of the catalyst base may be improved.

After contact with the hydroxy-aluminum solution, the catalytic support or carrier can be dried and calcined by the usual methods of the prior art. If desired, catalytic promoters can be included herewith.

The amount of the hyroxy-aluminum solution that should be used in treating the crystalline catalytic support may vary within wide limits depending upon the particular reaction which the support is being prepared to catalyze. Generally, greater than 10 percent of the exchangeable cation capacity of the crystalline catalytic support will be replaced by the hyroxy-aluminum species.

The surface area of the resulting catalyst can be adjusted as necessary by several means such as varying the area of the support to be treated, varying the treatment dosage and varying the calcination conditions. Generally a surface area of above 50 $m^2/g$. is preferred. Generally, the surface area would not exceed about 750 $m^2/g$. and more preferably would not exceed about 500 $m^2/g$.

When the improved catalytic support of the present invention is to be used for catalytic cracking, hydrocracking and/or isomerization processes, it is preferred that it have a surface area above about 200 $m^2/g$, and preferably within the range of about 300 to about 500 m²/g. Conventional hydrogenative components are included with the support for most applications other than catalytic cracking. Any hydrogenating component may be used. For example, hydrogenating components of Groups IV, V, VI, VII, and VIII of the Periodic Table are useful alone or in combination with each other. The particular hydrogenating component chosen will depend on the particular reactions that it is desired to promote. Those skilled in the art are aware of which hydrogenating components are most useful for which reactions.

When the novel support of the present invention is to be used, for example, for demetallation, desulfurization or hydrocracking of heavy petroleum fractions such as residua, the catalytic components, which may exist as metals or compounds, e.g., oxides, sulfides, fluorides or the like are preferably at least one of nickel or cobalt along with at least one of molybdenum or tungsten, or more generally a Group VI component associated along with a non-noble metal of Group VIII. The surface area of catalysts used for demetallation, desulfurization and hydrocracking of heavy feedstocks is preferably within the range from about 100–200 m²/g with average pore diameters in the range of 100–1000 Angstrom units.

In one particularly preferred embodiment the hydroxy-aluminum solution is produced from aluminum chloride and ammonium hydroxide. The solution is prepared by partially neutralizing an aluminum chloride solution with ammonium hydroxide with agitation. Aluminum chloride hexahydrate may be dissolved in an amount of 8.7 pounds per barrel of water by slow addition to water. After the aluminum chloride solution is prepared, ammonium hydroxide in an amount of 2.6 pounds per barrel may be slowly added to the aluminum chloride solution. The ammonium hydroxide is added to the solution at the point which will provide the best mixing and at a rate such that all will be added in from generally about 30 minutes to about 1 hour. The mixture will cloud during the addition of hydroxide due to the formation of a precipitate. However, the solution will clarify in time depending on the temperature of the aluminum concentration, the stirring vigor and the rate of addition of hydroxide solution.

The clear hydroxy-aluminum solution may be used directly to treat catalyst supports, and more particularly, crystalline catalyst supports to produce novel and improved catalyst supports.

Another method for making the hydroxy-aluminum solution of the invention, and in fact a preferred method, is to bring together solutions of an aluminum salt and ammonia, or substituted ammonia, an alkali, or an alkaline earth base, in a high shear zone. In the preferred form the hydroxy-aluminum solution is prepared in a high shear mixe by proportion mising of aluminum chloride and ammonium hydroxide solutions. The hydroxy aluminum solution may be prepared in any concentration below its saturation value. However, a 20× concentrate containing about 97 lbs./bbl. equivalent AlCl₃ (275 Gr/l) is the most practical. This concentrate is diluted 20 fold prior to application to a crystalline catalytic support. The exact quantities ofthe aluminum chloride and hydroxide solutions will depend on their concentration, purity and the desired OH/Al ratio of the product.

EXAMPLE

As an example of a catalytic support prepared in accordance with the present invention, the following procedure can be carried out.

About 100 grams of montmorillonite clay in the ammonium form and having a silica/alumina ratio of about 2.2 can be blended in a Waring Blender or the like with about 2 liters of water. An about 0.1 molar hydroxy-aluminum solution can be added to the water-clay blend in sufficient amount to provided at least 0.1 mole of hydroxy-aluminum per cation exchangeble equivalent of the clay. The solution is then blended for a short time. The clay after contact with the hydroxy-aluminum solution will flocculate readily. After flocculation, the clay is removed from the solution by filtration and is suspended in fresh water (about 2 liters). The slurry is allowed to age for about 24 hours.

The aged hydroxy-aluminum treated clay slurry is refiltered. The filter cake is impregnated with catalytic metals either in the nascent wet state or after drying, using well-known procedures.

The catalytic component used can preferably be palladium or other metals of Group VIII in a concentration of typically about 1 to 10 percent calculated as the metal. If the catalytic component is a noble metal of Group VIII, and more particularly if it is palladium, the preferred amount is about 0.2 to 1 percent.

The impregnated catalyst support is calcined to activate it. The resultant catalyst is useful for hydrocracking, hydroisomerization and the like.

From the above description it is evident that the invention provides a novel catalyst support and a method of making this novel catalyst support, as well as hydrocarbon conversion process using said novel catalyst support. Although only specific embodiments of the present invention have been described above, the invention is not meant to be limited thereto, but is meant to include all embodiments coming within the scope of the appended claims.

What is claimed is:

1. In a hydrocarbon conversion process for the production of hydrocracked hydrocarbons by hydrocracking said hydrocarbon in a conversion catalyzed by a catalyst comprising a support and at least one hydrogenating component selected from the group consisting of Groups IV, V, VI, VII and VIII of the Periodic Table, said support being a crystalline silica-alumina having a surface area within the range from about 50 to about 750 m² per gram selected from the group consisting of natural and synthetic clay-type minerals and zeolitic molecular sieves; and said conversion being effected under ordinary hydrocarbon hydroconversion conditions, the improvement which comprises carrying out said hydrocracking wherein said catalyst support is stabilized, said stabilization having been effected by treating said support with an aqueous hydroxy-aluminum solution having a ratio of hydroxyl groups to aluminum atoms in the range from about 1.5 to about 2.7.

2. A process as in claim 1 wherein said ratio of hydroxy groups to aluminum atoms is from 2.0 to 2.4.

3. A process as in claim 1 wherein said hydroxy-aluminum solution is about 0.1 molar.

4. A process as in claim 1 wherein said treatment includes aging said stabilized support in water for at least 3 hours.

5. A process as in claim 1 wherein said aging is for a period of about 25 hours.

6. A process as in claim 1 wherein said hydrogenating component is selected from the group consisting of non-noble metals of Group VIII of the Periodic Table.

7. A process as in claim 1 wherein said component is palladium.

8. A process as in claim 1 wherein said hydrocarbon is a heavy petroleum fraction and said hydrogenating component exists as metal or a compound of the metal selected from the group consisting of oxides, sulfides and fluorides.

9. A process as in claim 1 wherein said hydrogenating component comprises a Group VI component associated along with a non-noble metal Group VIII component.

10. A process as in claim 9 wherein said Group VIII component is at least one selected from the group consisting of cobalt and nickel and said Group VI component is at least one selected from the group consisting of molybdenum and tungsten.

11. In a hydrocarbon conversion process for the production of hydrodesulfurized hydrocarbons by hydrodesulfurizing said hydrocarbon in a conversion catalyzed by a catalyst comprising a support and at least one hydrogenating component selected from the group consisting of Groups IV, V, VI, VII and VIII of the Periodic Table, said support being a crystalline silica-alumina having a surface area within the range from about 50 to about 750 m$^2$ per gram selected from the group consisting of natural and synthetic clay-type minerals and zeolitic molecular sieves; and said conversion being effected under ordinary hydrocarbon hydroconversion conditions, the improvement which comprises carrying out said hydrodesulfurizing wherein said catalyst support is stabilized, said stabilization having been effected by treating said support with an aqueous hydroxy-aluminum solution having a ratio of hydroxyl groups to aluminum atoms in the range from about 1.5 to about 2.7.

12. In a hydrocarbon conversion process for the production of hydrodemetalized hydrocarbons by hydrodemetalizing said hydrocarbon in a conversion catalyzed by a catalyst comprising a support and at least one hydrogenating component selected from the group consisting of Groups IV, V, VI, VII and VIII of the Periodic Table, said support being a crystalline silica-alumina having a surface area within the range from about 50 to about 750 m$^2$ per gram selected from the group consisting of natural and synthetic clay-type minerals and zeolitic molecular sieves; and said conversion being effected under ordinary hydrocarbon hydroconversion conditions, the improvement which comprises carrying out said hydrodemetalizing wherein said catalyst support is stabilized, said stabilization having been effected by treating said support with an aqueous hydroxy-aluminum solution having a ratio of hydroxyl groups to aluminum atoms in the range from about 1.5 to about 2.7.

* * * * *